US008594717B2

(12) United States Patent
Roberts

(10) Patent No.: US 8,594,717 B2
(45) Date of Patent: Nov. 26, 2013

(54) METHOD AND APPARATUS FOR IDENTIFYING SUPPORTED TRANSMISSION CHANNEL CONFIGURATIONS

(75) Inventor: Gideon Roberts, Stone (GB)

(73) Assignee: BlackBerry Limited, Waterloo (CA)

(*) Notice: Subject to any disclaimer, the term of this patent is extended or adjusted under 35 U.S.C. 154(b) by 1356 days.

(21) Appl. No.: 11/625,405

(22) Filed: Jan. 22, 2007

(65) Prior Publication Data
US 2008/0175192 A1    Jul. 24, 2008

(51) Int. Cl.
*H04B 7/00* (2006.01)
(52) U.S. Cl.
USPC ........... 455/522; 455/523; 455/504; 455/505; 455/513; 370/335; 370/328; 370/338; 370/288
(58) Field of Classification Search
USPC .......... 370/329, 288, 328, 338, 335; 455/513, 455/522, 515, 115.3, 127.1, 450, 523, 504, 455/505, 501, 514, 516, 517
See application file for complete search history.

(56) References Cited

U.S. PATENT DOCUMENTS

| | | | |
|---|---|---|---|
| 6,832,096 B2 | 12/2004 | Haim | |
| 6,904,290 B1 | 6/2005 | Palenius | |
| 7,130,330 B2 * | 10/2006 | Reznik et al. | 375/148 |
| 7,321,570 B2 * | 1/2008 | Ratasuk et al. | 370/318 |
| 2003/0054773 A1 * | 3/2003 | Vanghi | 455/70 |
| 2003/0086405 A1 * | 5/2003 | Silva et al. | 370/342 |
| 2005/0169293 A1 | 8/2005 | Zhang et al. | |
| 2012/0008559 A1 * | 1/2012 | Leung et al. | 370/328 |

OTHER PUBLICATIONS

3GPP: "Universal Mobile Telecommunications System (UMTS); Medium Access Control (MAC) protocol specification (3GPP TS 25.321 version 3.15.0 Release 1999)," ETSI TS 125 321 V3.15.0 (Mar. 2003), Sophia Antipolis Cedex, France.
3GPP: "Universal Mobile Telecommunications System (UMTS); Requirements for support of radio resource management (FDD) (3GPP TS 25.133 version 3.13.0 Release 1999)," ETSI TS 125 133 V3.13.0 (Mar. 2003), Sophia Antipolis Cedex, France.

* cited by examiner

*Primary Examiner* — Patrick Edouard
*Assistant Examiner* — Fred Casca
(74) *Attorney, Agent, or Firm* — Novak Druce Connolly Bove + Quigg LLP

(57) ABSTRACT

A method for identifying supported transmission channel configurations in a mobile communications apparatus, the method comprising: calculating the required power value for each transmission channel configuration; and performing a sequential comparison of: an indication of an available measured power value, and an indication of the required power for each transmission channel configuration; and identifying a particular transmission channel configuration as supported if the required power for the particular transmission channel configuration is less than the available power value; wherein: the sequential comparison is performed in order of magnitude of value of the indication of the required power; and the method further comprising stopping said comparison when a supported transmission channel configuration is identified.

13 Claims, 9 Drawing Sheets

| | Bitrate | | | | Gain | Minimum Set? | Required Power | State |
|---|---|---|---|---|---|---|---|---|
| | $trch_1$ | $trch_2$ | $trch_3$ | $trch_4$ | | | | |
| $TFC_0$ | 0 | 0 | 0 | 0 | $\beta_{c0}, \beta_{d0}$ | Yes | $P_{Rq0}$ | Supported |
| $TFC_1$ | 50 | 0 | 0 | 0 | $\beta_{c1}, \beta_{d1}$ | Yes | $P_{Rq1}$ | Supported |
| $TFC_2$ | 0 | 50 | 0 | 0 | $\beta_{c2}, \beta_{d2}$ | Yes | $P_{Rq2}$ | Supported |
| ⋮ | ⋮ | ⋮ | ⋮ | ⋮ | ⋮ | ⋮ | ⋮ | ⋮ |
| $TFC_r$ | 100 | 100 | 0 | 0 | $\beta_{cr}, \beta_{dr}$ | No | $P_{Rq(r)}$ | Excess Power |
| ⋮ | ⋮ | ⋮ | ⋮ | ⋮ | ⋮ | ⋮ | ⋮ | ⋮ |
| $TFC_{N-1}$ | 250 | 300 | 500 | 800 | $\beta_{c(N-1)}, \beta_{d(N-1)}$ | No | $P_{Rq(N-1)}$ | Blocked |

Fig. 8

|  | Bitrate | | Gain | Minimum Set? | Required Power | State |
|---|---|---|---|---|---|---|
|  | trch$_1$ | trch$_2$ | | | | |
| TFC$_5$ | 500 | 500 | $\beta_{c5}, \beta_{d5}$ | No | P$_{RQ5}$ | Supported |
| TFC$_4$ | 250 | 200 | $\beta_{c4}, \beta_{d4}$ | No | P$_{RQ4}$ | Supported |
| TFC$_3$ | 150 | 50 | $\beta_{c3}, \beta_{d3}$ | No | P$_{RQ3}$ | Supported |
| TFC$_2$ | 0 | 50 | $\beta_{c2}, \beta_{d2}$ | Yes | P$_{RQ2}$ | Supported |
| TFC$_1$ | 50 | 0 | $\beta_{c1}, \beta_{d1}$ | Yes | P$_{RQ1}$ | Supported |

Fig. 9a

|  | Bitrate | | Gain | Minimum Set? | Required Power | State |
|---|---|---|---|---|---|---|
|  | trch$_1$ | trch$_2$ | | | | |
| TFC$_5$ | 500 | 500 | $\beta_{c5}, \beta_{d5}$ | No | P$_{RQ5}$ | Excess Power |
| TFC$_4$ | 250 | 200 | $\beta_{c4}, \beta_{d4}$ | No | P$_{RQ4}$ | Excess Power |
| TFC$_3$ | 150 | 50 | $\beta_{c3}, \beta_{d3}$ | No | P$_{RQ3}$ | Supported |
| TFC$_2$ | 0 | 50 | $\beta_{c2}, \beta_{d2}$ | Yes | P$_{RQ2}$ | Supported |
| TFC$_1$ | 50 | 0 | $\beta_{c1}, \beta_{d1}$ | Yes | P$_{RQ1}$ | Supported |

Fig. 9b

|  | Bitrate | | Gain | Minimum Set? | Required Power | State |
|---|---|---|---|---|---|---|
|  | trch$_1$ | trch$_2$ | | | | |
| TFC$_5$ | 500 | 500 | $\beta_{c5}, \beta_{d5}$ | No | P$_{RQ5}$ | Blocked |
| TFC$_4$ | 250 | 200 | $\beta_{c4}, \beta_{d4}$ | No | P$_{RQ4}$ | Supported |
| TFC$_3$ | 150 | 50 | $\beta_{c3}, \beta_{d3}$ | No | P$_{RQ3}$ | Supported |
| TFC$_2$ | 0 | 50 | $\beta_{c2}, \beta_{d2}$ | Yes | P$_{RQ2}$ | Supported |
| TFC$_1$ | 50 | 0 | $\beta_{c1}, \beta_{d1}$ | Yes | P$_{RQ1}$ | Supported |

Fig. 9c

METHOD AND APPARATUS FOR IDENTIFYING SUPPORTED TRANSMISSION CHANNEL CONFIGURATIONS

TECHNICAL FIELD

This application relates to telecommunications systems in general, having for example application in UMTS (Universal Mobile Telecommunications System). In particular, this application relates to a method and apparatus for identifying supported transmission channel configurations.

DESCRIPTION OF THE RELATED ART

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In a typical cellular radio system, a mobile communications apparatus communicates via a radio access network (RAN) to one or more core networks. The mobile communications apparatus or User Equipment (UE) comprises various types of equipment such as mobile telephones (also known as cellular or cell phones), laptops with wireless communication capability, personal digital assistants (PDAs) etc. These may be portable, hand held, pocket sized, installed in a vehicle etc and communicate voice and/or data signals with the radio access network.

In the following, reference will be made to UMTS and to particular standards. However it should be understood that the invention is not intended to be limited to any particular mobile telecommunications system or standard.

UMTS is a third generation public land mobile telecommunication system. Various standardization bodies are known to publish and set standards for UMTS, each in their respective areas of competence. For instance, the 3GPP (Third Generation Partnership Project) has been known to publish and set standards for GSM (Global System for Mobile Communications) based UMTS, and the 3GPP2 (Third Generation Partnership Project 2) has been known to publish and set standards for CDMA (Code Division Multiple Access) based UMTS. Within the scope of a particular standardization body, specific partners publish and set standards in their respective areas.

Consider as an example a wireless mobile device which complies with the 3GPP specifications for the UMTS protocol. Such a wireless mobile device is generally referred to as user equipment (UE). The 3GPP technical specification 25.133, V3.13.0, referred to herein as the 25.133 specification, addresses the subject of UE requirements for support for radio resource management.

A UE according to the UMTS standard comprises a protocol stack. In the protocol stack, a Medium Access Controller (MAC) communicates with a physical layer via transport channels. The transport channels used and the transmission rate for each are defined by a transmission channel configuration. A single transmission channel configuration defines the transport channel or channels used, and the appropriate bit rate or bit rates for each. A transmission channel configuration may define a bit rate of zero for each transport channel, this would be selected for use by the UE if, for example, there was no data to transmit.

In the UMTS standard, a transmission channel configuration is called a Transport Format Combination (TFC). The explanations given herein use the 3GPP terminology for the sake of simplicity. However, it should be noted that the method and apparatus described herein may be applied to any wireless communication system wherein a transmission channel configuration (TFC or otherwise) must be selected from a set of possible transmission channel configurations. In UMTS the set of possible transmission channel configurations is called a Transport Format Combination Set (TFCS).

A UE according to the UMTS standard selects a TFC for use according to a number of factors as discussed below. In order to perform this selection, the UE must monitor which TFCs it can use. This is done by assigning one of three states to each TFC. These states are: Supported, Excess-Power, and Blocked. A TFC in the Supported state may be selected by the UE for use in transmission. A TFC in the Excess-Power state is identified as requiring more power than is allowed for transmission. A TFC in the Excess-Power state may still be selected, but if a TFC is identified as being in the Excess-Power state for a predefined period of time, then it moves to the Blocked state. A TFC in the Blocked state cannot be selected by the UE for use in transmission. The states are assigned according to elimination, recovery and blocking criterion.

In accordance with Section 6.4 of the 25.133 specification, the user equipment shall continuously evaluate elimination, recovery and blocking criterion in order to select transport format combinations (TFCs) that it may use. A transport format combination set (TFCS) is defined as the set of possible TFCs from which the UE may select a single TFC. The evaluation shall be performed for every TFC in the TFCS using an estimated UE transmit power. This procedure is performed each radio frame, which in a UMTS network is every 10 ms.

As mobile communications apparatus are used for an ever wider range of functions, efficient CPU utilisation becomes paramount. There is a continuing trend for smaller and lighter mobile communications apparatus. More efficient CPU utilisation is advantageous because it results in reduced power consumption allowing for improved battery run time and/or a smaller battery resulting in a smaller and lighter mobile communications apparatus. However, a significant amount of CPU capacity may be devoted to the evaluation procedure as described above.

The invention is set out in the claims.

BRIEF DESCRIPTION OF THE DRAWINGS

Embodiments will now be described, by way of example only, with reference to the attached drawings, in which:

FIG. 8 shows an example of a data structure which may be used in the implementation of the method and apparatus described herein; and FIG. 9a shows an example data structure for a TFCS wherein all TFCs are supported;

FIG. 9b shows the data structure for the TFCS from FIG. 9a and their status after a reduction in power available for transmission; and FIG. 9c shows the data structure for the TFCS from FIG. 9b and their status after an increase in power available for transmission to a level above that of FIG. 9b, but below that of FIG. 9a.

Where appropriate, like reference numerals are used in different figures to denote like elements.

DETAILED DESCRIPTION OF THE DRAWINGS

Figure 1:
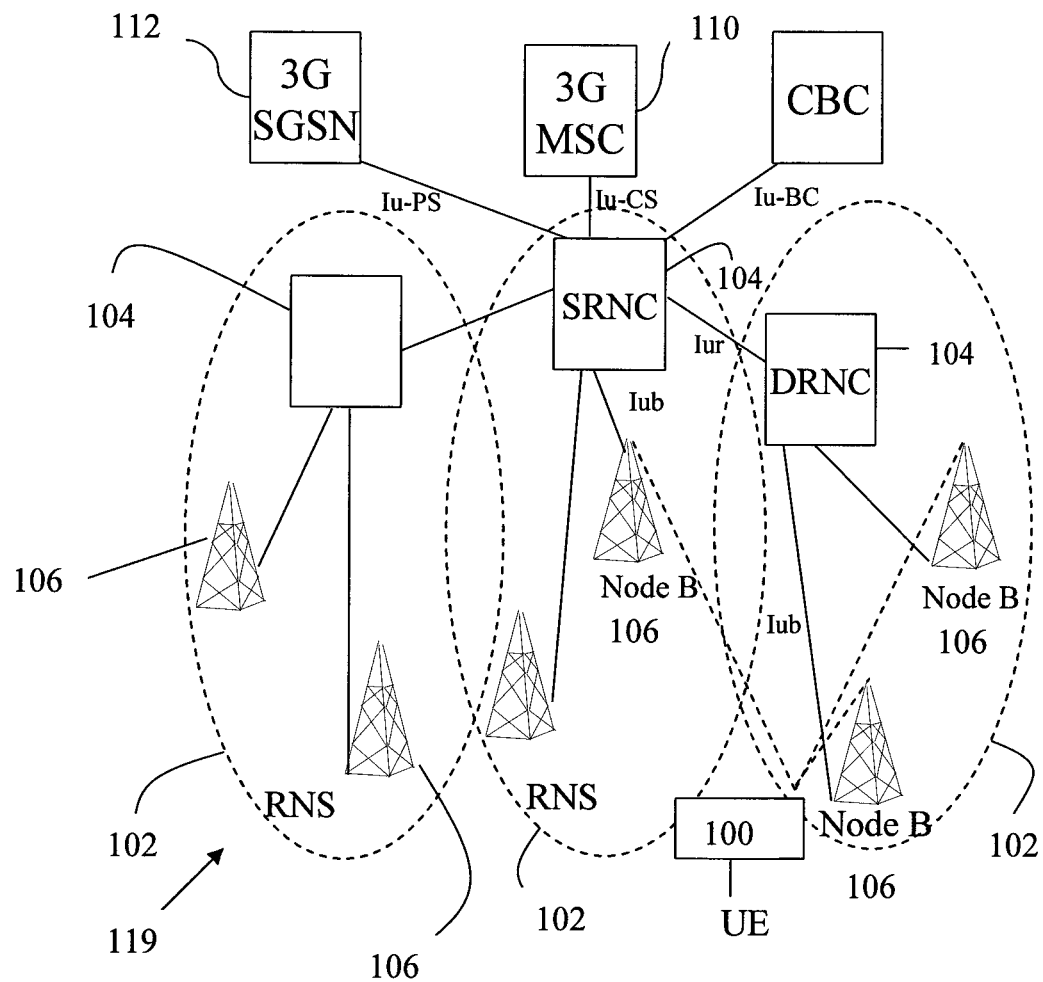
FIG. 1 is a schematic diagram showing an overview of a network and a UE.

In a first aspect of the method disclosed herein, pre-calculation is performed for each TFC. The pre-calculation comprises calculating an estimated power requirement for each TFC. As a result of the pre-calculation, at each radio frame when the UE performs the evaluation, the UE need only take the power value derived from the previous frame and perform a comparison with the pre-calculated estimated power requirement values for each TFC. The pre-calculation need only be performed when the UE is reconfigured, significantly less often than every radio frame. As such, this method greatly reduces the amount of calculation required for performing TFC status evaluation.

In a second aspect of the method disclosed herein, the way the calculation is performed is modified so as to further reduce the amount of calculation required. Pre-calculation may be performed for each TFC in a similar manner to the first aspect. At each radio frame, when the UE performs the evaluation, the UE compares the TFC with the highest estimated power requirement first, and then moves on, in order of decreasing estimated power requirement. Because the TFCs are evaluated in order of magnitude of power requirement, when a TFC in the Supported state is identified, the UE knows that all the subsequent TFCs are also supported. This is because all subsequent TFCs will have an estimated power requirement less than the first identified TFC in the Supported state. The comparison still needs to be performed every radio frame, but far fewer comparisons are required for any given set of TFCs because the comparison can be stopped before all the TFCs are checked. Again, the pre-calculation of the estimated power requirement values need only be performed when the UE is reconfigured. This method further reduces the amount of calculation required for performing the TFC status evaluation.

The TFCs supported by the UE are ordered in terms of decreasing power threshold level. So, the TFC with the strictest threshold is first (the TFC which has the highest power requirement).

The TFCs may be ordered by magnitude of power requirement by first calculating the power requirement, or by ordering by magnitude of some other value, such as, for example, a gain relationship. A gain relationship may be a ratio of gain factors. For example, one gain relationship for a particular TFC is the ratio of the gain factors for DPDCH and DPCCH for the TFC.

When performing the power estimation process, the first ordered TFC is checked. If the estimated power for this TFC does NOT meet the Elimination criteria (i.e. the TFC can still be supported by the UE), then it is not necessary to check any of the other TFCs because these require less power.

If the first TFC does meet the Elimination criteria, then further TFCs must be checked. As soon as a TFC is found which does not meet the Elimination criteria, then no further evaluation is required—all the other TFCs will also fail to meet the Elimination criteria.

In good radio conditions, it is likely only the first ordered TFC will need to be checked, thus saving CPU time. This solution is more efficient than prior solutions in terms of CPU usage in good radio conditions because not all TFCs need to be evaluated.

Implementation of the methods described herein may allow for reduced power consumption in a CPU of a mobile communications apparatus. Further, implementation of the method described herein may also allow for CPU processing capacity to be devoted to functions other than managing the wireless communication link.

Other aspects and features of the proposed strategy will become apparent to those ordinarily skilled in the art upon review of the following description of specific embodiments of a method and apparatus for improved transmission power control in a mobile communications apparatus.

The above described method may be embodied in the MAC layer of the UMTS protocol stack. The MAC layer performs a function to estimate the power required to transmit each of the supported data formats. In UMTS, these data formats are called TFCs—transport format combinations. This calculation is performed using known power levels for the most recent TFC used for transmission and a set of gain factors for each of the other supported TFCs. The power can then be estimated for each of the non-used TFCs.

The gain factor of each TFC may be signalled or computed. Signalled gain factors for each TFC are obtained directly from the configuration data (gain factor information) in the TFCs. Computed gain factors are calculated from a referenced TFC.

A TFC power control procedure is used to reduce the data rate of a connection in order to preserve continuity for sensitive applications (e.g. speech). This procedure is performed each radio frame (every 10 ms), and so needs to be as efficient as possible in terms of CPU usage.

Disclosed herein is an optimisation to the above process in order to reduce the CPU utilization.

A method and apparatus for identifying supported transmission channel configurations in a mobile communications apparatus is described. In the following description, for the purposes of explanation, numerous specific details are set forth in order to provide a thorough understanding of the present invention. It will be apparent to one skilled in the art that the technique may be practiced without these specific details. In the other instances, well-known structures and devices are shown in block diagram form in order to avoid unnecessarily obscuring the content of this document.

The needs identified in the foregoing background, and other needs that will become apparent from the following description, are achieved by, in one aspect, a method of identifying supported transmission channel configurations in a mobile communications apparatus. In other aspects, the needs are achieved by a mobile communications arranged to perform the method of identifying supported transmission channel configurations. In yet other aspects, the needs are achieved by a computer program product comprising code means stored on a computer readable medium for performing the method of identifying supported transmission channel configurations in a mobile communications apparatus. In particular, the method may be implemented in a mobile telecommunications apparatus, with or without voice capabilities, or other electronic devices such handheld or portable devices.

The method disclosed herein may be implemented in a user equipment device of a wireless communications network. Referring to the drawings, FIG. 1 is a schematic diagram showing an overview of a network and a user equipment device. Clearly in practice there may be many user equipment devices operating with the network but for the sake of simplicity FIG. 1 only shows a single user equipment device 100. For the purposes of illustration, FIG. 1 also shows a radio access network 119 (UTRAN) used in a UMTS system having a few components. It will be clear to a person skilled in the art that in practice a network will include far more components than those shown.

The network 119 as shown in FIG. 1 comprises three Radio Network Subsystems (RNS) 102. Each RNS has a Radio Network Controller (RNC) 104. Each RNS 102 has one or more Node B 102 which are similar in function to a Base Transmitter Station of a GSM radio access network. User Equipment UE 100 may be mobile within the radio access network. Radio connections (indicated by the straight dotted lines in FIG. 1) are established between the UE and one or more of the Node Bs in the UTRAN.

Figure 2:
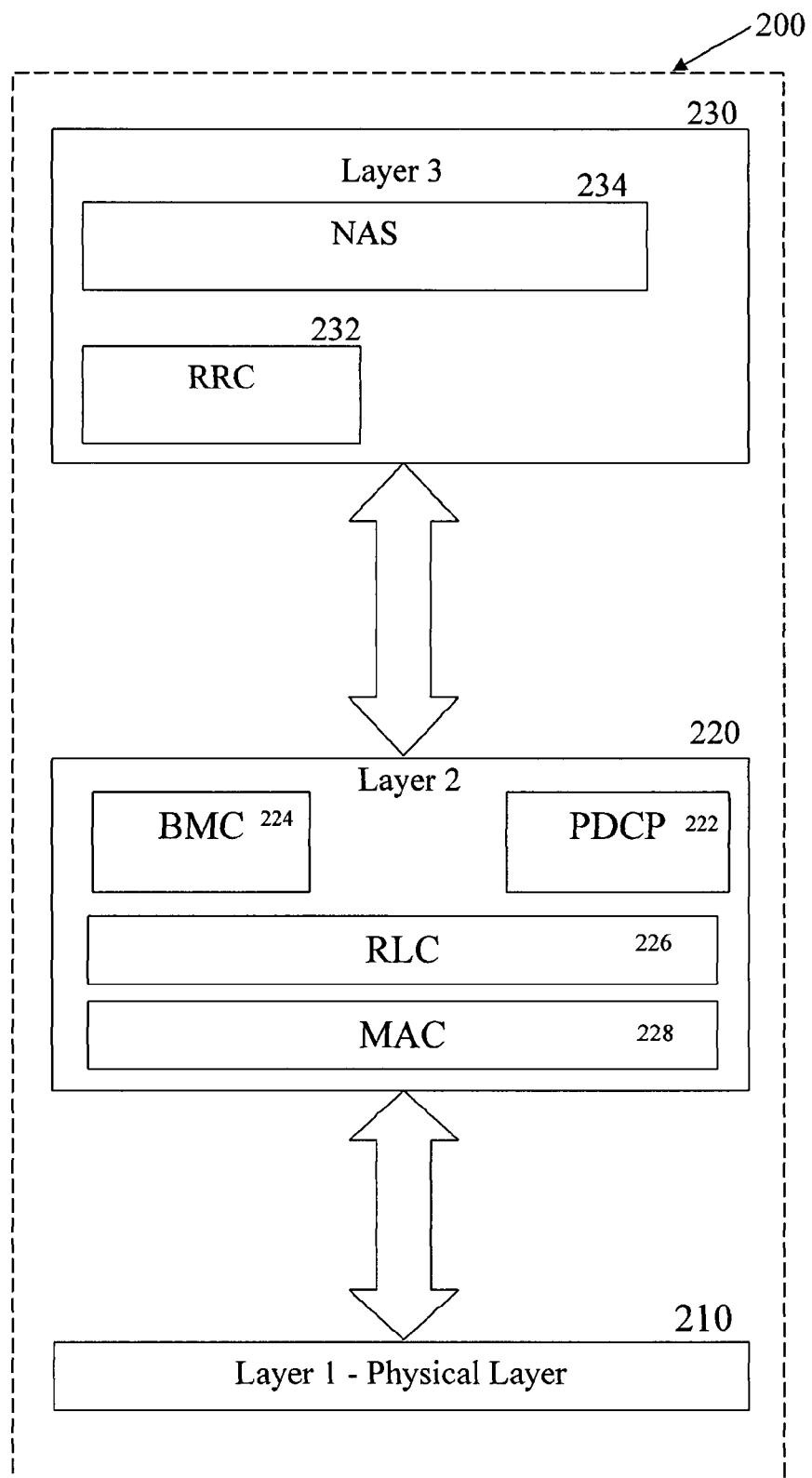
FIG. 2 is a block diagram illustrating a UE protocol stack.

Within each UE of a UMTS network, a protocol stack controls the operation of the device. FIG. 2 is a block diagram illustrating such a UE protocol stack. A Radio Resource Controller (RRC) block 232 is a sub layer of Layer 3 230 of a UMTS protocol stack 200. The RRC 232 exists in the control plane only and provides an information transfer service to the non-access stratum NAS 234. The RRC 232 is responsible for controlling the configuration of radio interface Layer 1 210 and Layer 2 220. When the UTRAN needs to change the UE configuration it issues a message to the UE containing a command to invoke a specific RRC procedure. A MAC 228 is a layer 2 protocol that handles communications between the RLC 226 and the Physical Layer 210. The MAC 228 is shown in more detail in FIG. 3.

Figure 3:
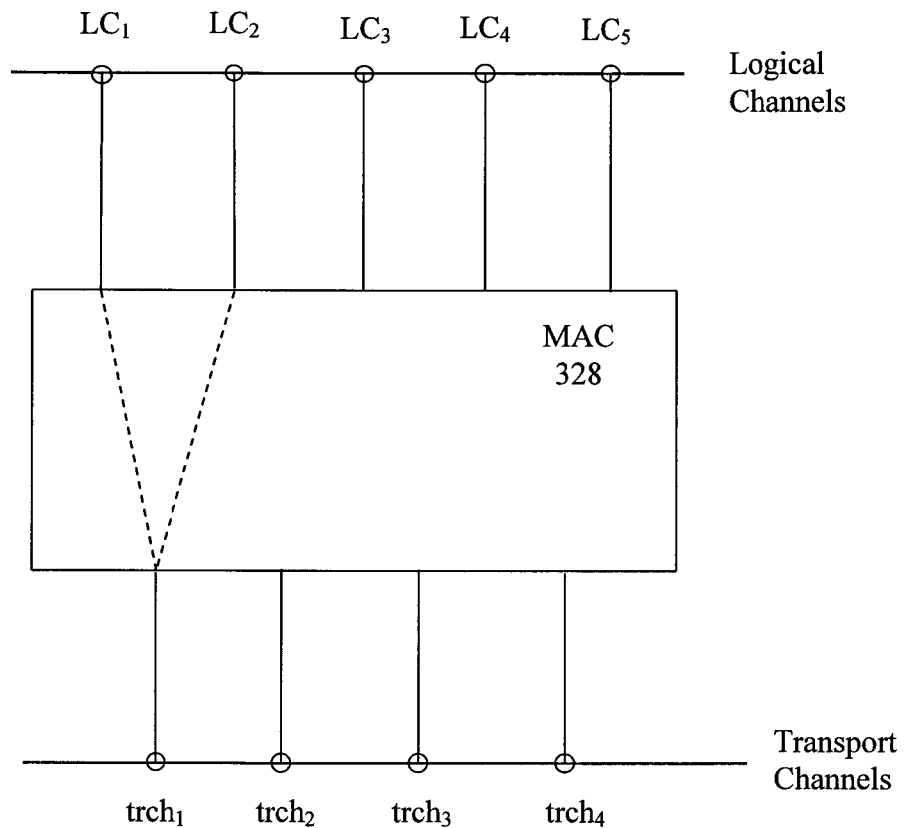
FIG. 3 is a block diagram showing the relationship between the logical channels and the transport channels of a UE protocol stack.

FIG. 3 is a block diagram showing a MAC 328 and shows the relationship between the logical channels and the transport channels of a UE protocol stack. The MAC 328 is a layer 2 protocol which operates between the upper layer RLC 326 and the lower physical layer, layer 210. The MAC 328 interfaces with the RLC 326 via logical channels. By way of example, five logical channels are shown in FIG. 3 labelled $LC_1$, $LC_2$, $LC_3$, $LC_4$ and $LC_5$. The MAC 328 communicates with the physical layer 310 via transport channels. Again by way of example, four transport channels are shown in FIG. 3 labelled $trch_1$, $trch_2$, $trch_3$ and $trch_4$. Of course in practice any number of logical and transport channels can be accommodated.

The MAC 328 provides the following services to the upper layers: Data Transfer, Reallocation of Radio Resources and MAC parameters, and Reporting of Measurements.

Of interest here is that the MAC provides data transfer services to the RLC on logical channels. The MAC 328 receives data for transmission from the RLC 326 on one or more logical channels. The MAC 328 coordinates which transport channels to be used by the UE to transmit data via the physical layer 310. The MAC 328 provides a mapping from the logical channels to the transport channels.

A set of logical channel types is defined for different kinds of data transfer services as offered by the MAC. Each logical channel type is defined by the type of information it transfers. Logical channels may be generally classified into two groups: control channels for the transfer of control plane information; and traffic channels for the transfer of user plane information.

Examples of logical control channels are: broadcast control channel (BCCH), paging control channel (PCCH), a dedicated control channel (DCCH), common control channel (CCCH), shared control channel (SCCH), multimedia broadcast multicast service (MBMS point-to-multipoint control channel MCCH), and MBMS point-to-multipoint scheduling channel (MSCH). Examples of logical traffic channels are: dedicated traffic channel (DTCH), common traffic channel (CTCH) and MBMS point-to-multipoint traffic channel (MTCH).

The physical layer offers information transport services to the MAC and high layers. The physical layer transport services are described by how and with what characteristics data are transferred over the radio interface. A term for this is transport channel. Transport channels may be generally classified into two groups: common transport channels and dedicated transport channels.

Examples of common transport channel types are: random access channel (RACH), forward access control (FACH), downlink shared channel (DSCH), uplink shared channel (USCH), broadcast channel (BCH), paging channel (PCH), and high speed downlink shared channel (HS-DSCH). Examples of dedicated transport channel types are: dedicated channel (DCH) and enhanced dedicated channel (EDCH).

The functions of the MAC 328 include:

Mapping between logical channels and transport channels. The MAC is responsible for mapping of logical channel(s) onto the appropriate transport channel(s).

Selection of appropriate Transport Format for each Transport Channel depending on instantaneous source rate. Given the TFCS assigned by RRC, MAC selects the appropriate TFC for each active transport channel depending on source rate. The source rate is the rate of information required to be transferred on any one logical channel. The control of transport formats ensures efficient use of transport channels.

Priority handling between data flows of one UE. When selecting between the TFCs in the given TFCS, priorities of the data flows to be mapped onto the corresponding Transport Channels can be taken into account. For example, time critical data like encoded speech requires a high priority to ensure seamless conversation. Priorities may be given by attributes of Radio Bearer services and RLC buffer status. The priority handling is achieved by selecting a TFC for which high priority data is mapped onto L1 with a "high bit rate" Transport Format, at the same time letting lower priority data be mapped with a "low bit rate" (which could be zero bit rate) Transport Format. Transport format selection also takes into account transmit power indication from Layer 1.

Additionally, the MAC 328 can perform other functions as defined in 3GPP TS 25.321 V3.15.0 6.1.

Referring to FIG. 3, the dotted lines in MAC 328 show an example of a transmission channel configuration or TFC in the 3GPP UMTS standard in which two logical channels ($LC_1$ and $LC_2$) are mapped to a single transport channel ($trch_1$). In UMTS, which logical channels can be mapped to which transport channels is governed by a set of standard practices. These may be different for uplink and downlink communication channels. For example, CCCH, DCCH, DTCH, can be mapped to RACH; DCCH and DTCH can be mapped to DCH. Further mapping connections exist and these are defined in 3GPP TS 25.301 V7.0.0 5.3.1.1.2.

In the specific embodiment, each TFC defines a bit rate available for transmission on each transport channel.

Each TFC requires an amount of power for transmission. Different TFCs may have different power requirements for transmission. Generally, the higher the bit rate provided by a TFC, the more power required by the radio transmitter of the user equipment for a transmission using the particular TFC. However, the user equipment has a maximum transmit power. The maximum transmit power may be set by a physical limitation of the user equipment, for example the maximum possible power output of the transmitter. The maximum transmit power of the user equipment may also or alternatively be set by the UTRAN so as to reduce the level of interference between a plurality of user equipments operating within the network. Accordingly, it is necessary for the user equipment to calculate whether each TFC would require more power than the maximum transmit power allowed.

Figure 4:
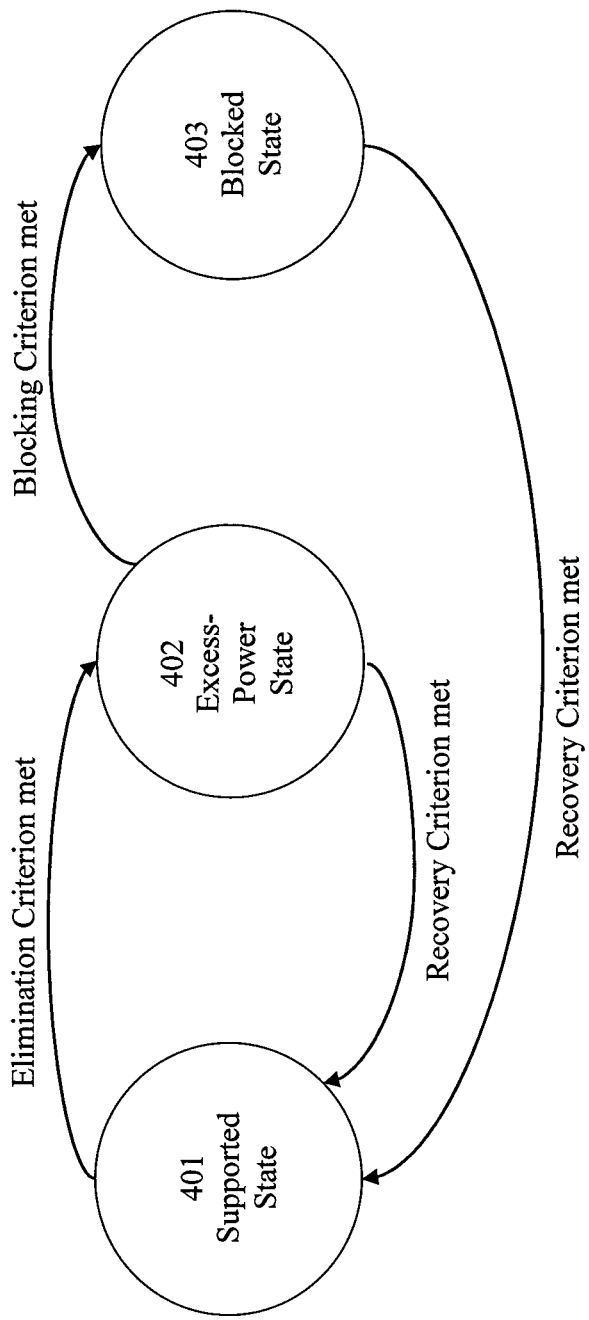
FIG. 4 shows state transitions for the possible states of a given TFC.

In order to do this one of various possible states are assigned to each TFC. FIG. 4 shows state transitions for the possible states of a given TFC. A given TFC can be in any one of the following states: Supported state, Excess-Power state and Blocked state. A TFC in the Blocked state 403 cannot be selected by the UE. TFCs in the Supported state 401 or Excess-Power state 402 can be selected by the UE. These three states and the transitions between them are shown in FIG. 4.

A TFC may transition to the Supported state 401 if the Recovery criterion is met for that TFC. The Recovery criterion for a given TFC is met if the estimated required UE transmit power needed for the given TFC has not been greater than the Maximum UE transmitter power for the last 30 successive measurement periods immediately preceding evaluation. If the Recovery criterion is met for a particular TFC then the MAC in the UE considers that the TFC is in the Supported state. A measurement period is defined in 3GPP TS 25.133 v3.13.0 section 9.1.6.1 as one slot (a UMTS radio frame consists of 15 slots).

A TFC may transition to the Excess-Power state 402 if the Elimination criterion is met for that TFC. The Elimination criterion for a given TFC is met if the estimated required UE transmit power needed for this TFC is greater than the Maximum UE transmitter power for at least 15 out of the last 30 successive measurement periods immediately preceding evaluation. If the estimated required UE transmit power needed for this TFC is greater than the Maximum UE transmitter power, then the power threshold of the elimination criterion is exceeded. For the Elimination criterion to be met, both the power threshold and the slot threshold (15 out of the last 30 successive measurement periods immediately preceding evaluation) should be met. If the Elimination criterion is met for a particular TFC then the MAC in the UE considers that the particular TFC is in the Excess-Power state.

The Maximum UE transmitter power is the lowest of: the Maximum allowed uplink transmit Power; and the UE maximum transmit power. The Maximum allowed uplink transmit Power is set by the UTRAN. The UE maximum transmit power is defined by the UE power class.

The evaluation of the Elimination criterion and the Recovery criterion are performed at least once per radio frame.

A TFC may transition to the Blocked state 403 if the Blocking criterion is met for that TFC. The UE considers the Blocking criterion for a given TFC to be fulfilled at the latest at the start of the longest uplink Transmission Time Interval (TTI) after the moment at which the TFC will have been in Excess-Power state for a duration of: $(T_{notify}+T_{modify}+T_{L1\_proc})$ where:

$T_{notify}$ equals 15 ms
$T_{modify}$ equals $MAX(T_{adapt\_max}, T_{TTI})$
$T_{L1\_proc}$ equals 15 ms
$T_{adapt\_max}$ equals $MAX(T_{adapt\_1}, T_{adapt\_2}, \ldots, T_{adapt\_N})$
N equals the number of logical channels that need to change rate
$T_{adapt\_n}$ equals the time it takes for higher layers to provide data to MAC in a new supported bit rate, for logical channel n. By way of example, $T_{adapt}$ for UMTS AMR is 40 ms, $T_{adapt}$ for UMTS AMR2 is 60 ms. For services where no codec is used $T_{adapt}$ shall be considered to be equal to 0 ms.

$T_{TTI}$ equals the longest uplink TTI of the selected TFC (ms). Data arrives to the coding/multiplexing unit once every TTI. The TTI is transport channel specific.

The time delay of $(T_{notify}+T_{modify}+T_{L1\_proc})$ is necessary in order to allow the higher layers of the protocol stack to reduce the data rate required on any logical channels in use before the MAC transitions to a TFC having a lower data rate. The higher layers can reduce the data rate required by, for example, using a lower bit rate codec.

The number of slots that meet the power requirement of the elimination criterion is recorded for each TFC. Since results for 30 slots must be checked to fully evaluate the elimination criterion, the results for the last 30 slots (2 radio frames in UMTS) must be recorded. The TFCs are checked in descending order of the threshold $P_{Rq(j)}$. When a TFC is found that has zero slots requiring "excess power", then all remaining TFCs are set to the same result, without further calculation.

A TFC with 0 slots out of 30 exceeding the power threshold of the elimination criterion (known as the recovery criterion) is transitioned to the Supported state.

A TFC in the Supported state with at least 15 slots out of 30 exceeding the power threshold of the elimination criterion is transitioned to the Excess-Power state.

A TFC in the Excess-Power state with one or more slots out of the previous 30 exceeding the power threshold for the elimination criterion is transitioned to the Blocked state, providing: it is not in the minimum set of TFCs, and the TFC has been in the Excess-Power state for the required number of frames. The required number of frames is max(TTI)+1. If these conditions are not met the TFC remains in the same state.

The UE continuously evaluates which TFCs can be used. The evaluation is performed for every TFC in the TFCS using an estimated UE transmit power of a given TFC. The UE transmit power estimation for a given TFC is made using the UE transmitted power measured over the measurement period, defined as one slot, and the gain factors of the corresponding TFC.

The TFCS is a list of TFCs which is sent to the UE by the UTRAN. It consists of all the TFCs which the UE is allowed to use. The information for each TFC comprises data rates for each transport channel and gain factors for DPCCH and DPDCH. The TFCS is the set of all configured TFCs. The candidate TFCs to be considered by the MAC for TFC selection may be restricted due to a TFC Subset being received by the UE. The TFC Subset is a subset of the TFCS which contains all TFCs the UE is allowed to use following reception of further information from the UTRAN. The UTRAN may send a list of allowed TFCs, a list of non-allowed TFCs or a list of transport channels which are restricted. TFCs which the UE is not allowed to select are still subject to power control evaluation as the restriction may be temporary. Power evaluation of non-allowed TFCs is necessary to allow the UE to use the correct TFC when the restriction is removed. The TFCS is only formed when a new configuration is received from the UTRAN. Selection criteria such as Priority are considered every time the TFC selection process is performed.

Figure 5:
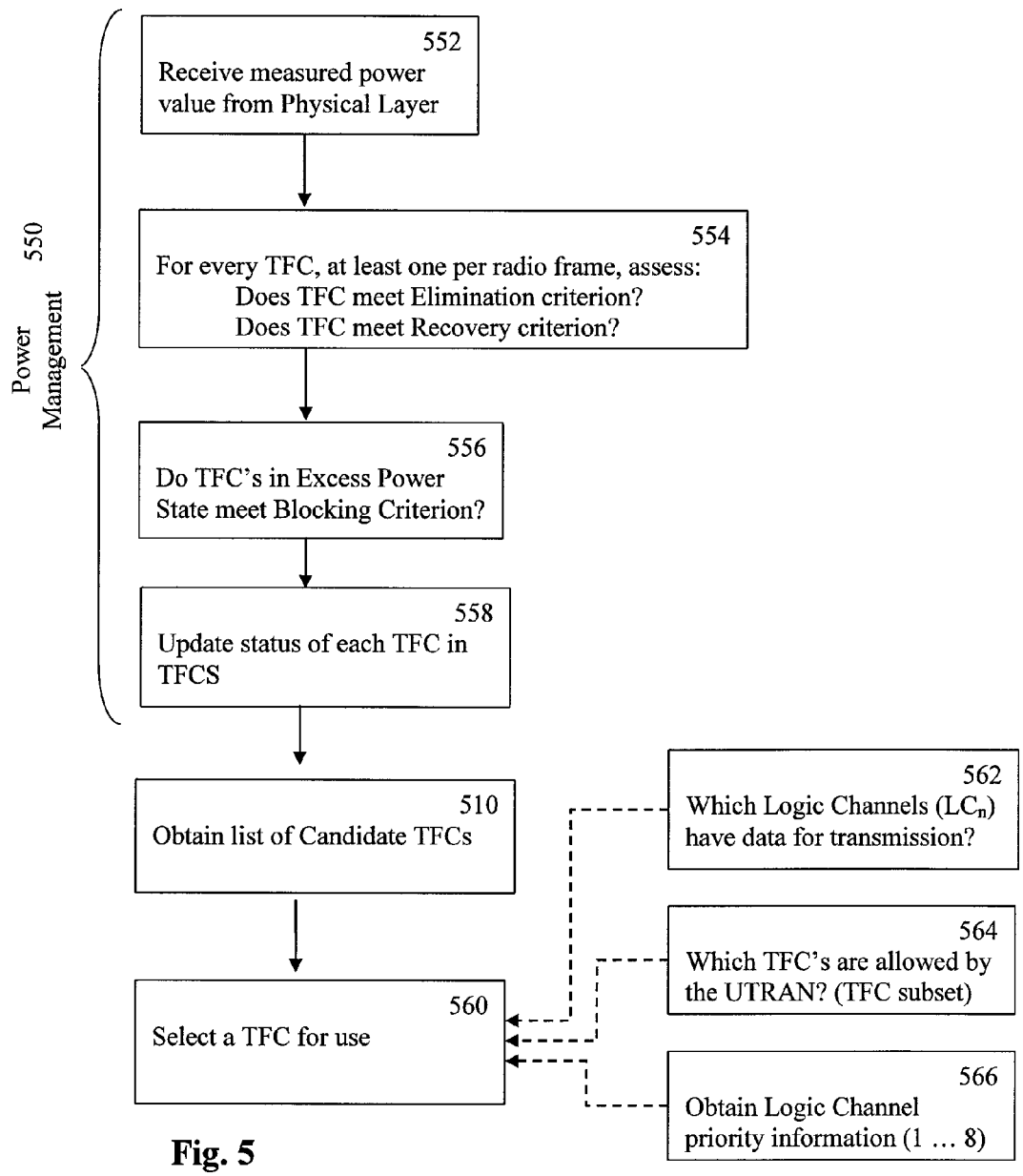
FIG. 5 is a flow diagram showing, at a high level, steps performed by a user equipment for selecting a transmission channel configuration.

A power management process implementing the above criterion is illustrated in FIG. 5. This is a high level block diagram of a method a user equipment (UE) may implement in order to select a TFC. At step 510 the UE obtains a list of candidate TFCs. A set of candidate TFCs is produced after the power management process, the candidate TFCs exclude those TFCs which are blocked for reasons of power control or not allowed due to some other restriction such as not being in the TFC Subset.

The power management steps 550 present a way of implementing known power management requirements defined in the 3GPP standards. At step 552 the MAC receives a measured power value from the physical layer. The measured power value for the previous slot is received by the MAC from the physical layer.

At step 554 the UE assesses whether each TFC meets the elimination criterion and then whether each TFC meets the recovery criterion. This assessment is performed at least once per radio frame.

At step 556 the UE establishes whether any TFCs in the Excess-Power state meet the blocking criterion. At step 558 the UE updates the status of each TFC in the TFCS according to the results of criterion tests in step 554 and step 556.

At step 560 the user equipment selects a TFC for use. The TFC selected at this stage must satisfy the selection criteria. Potential selection criteria are illustrated at steps 562, 564 and 566. At step 562 the UE considers which logic channels ($LC_n$) have data awaiting transmission. At step 564 the UE considers which TFC are allowed by the network. The network may limit which TFCs may be used. The TFCs allowed by the network form the TFC subset. At step 526 the UE obtains logic channel priority information. At radio bearer set or reconfiguration each appropriate logic channel is assigned a MAC logical channel priority (MLP). The MLP is a numerical value in the range 1 to 8. It is this MLP which may be used by the MAC to select a TFC.

At step 520, the various selection criteria are considered which narrow down the TFCs available for selection from the TFCS in addition to the power management 550.

However, the conventional approach described above requires a number of calculations to be performed. These calculations present a significant load on the processor of the mobile communications apparatus. This can consume a large amount of processor time. The processor load can be reduced by applying any combination of the following methods.

Figure 6:
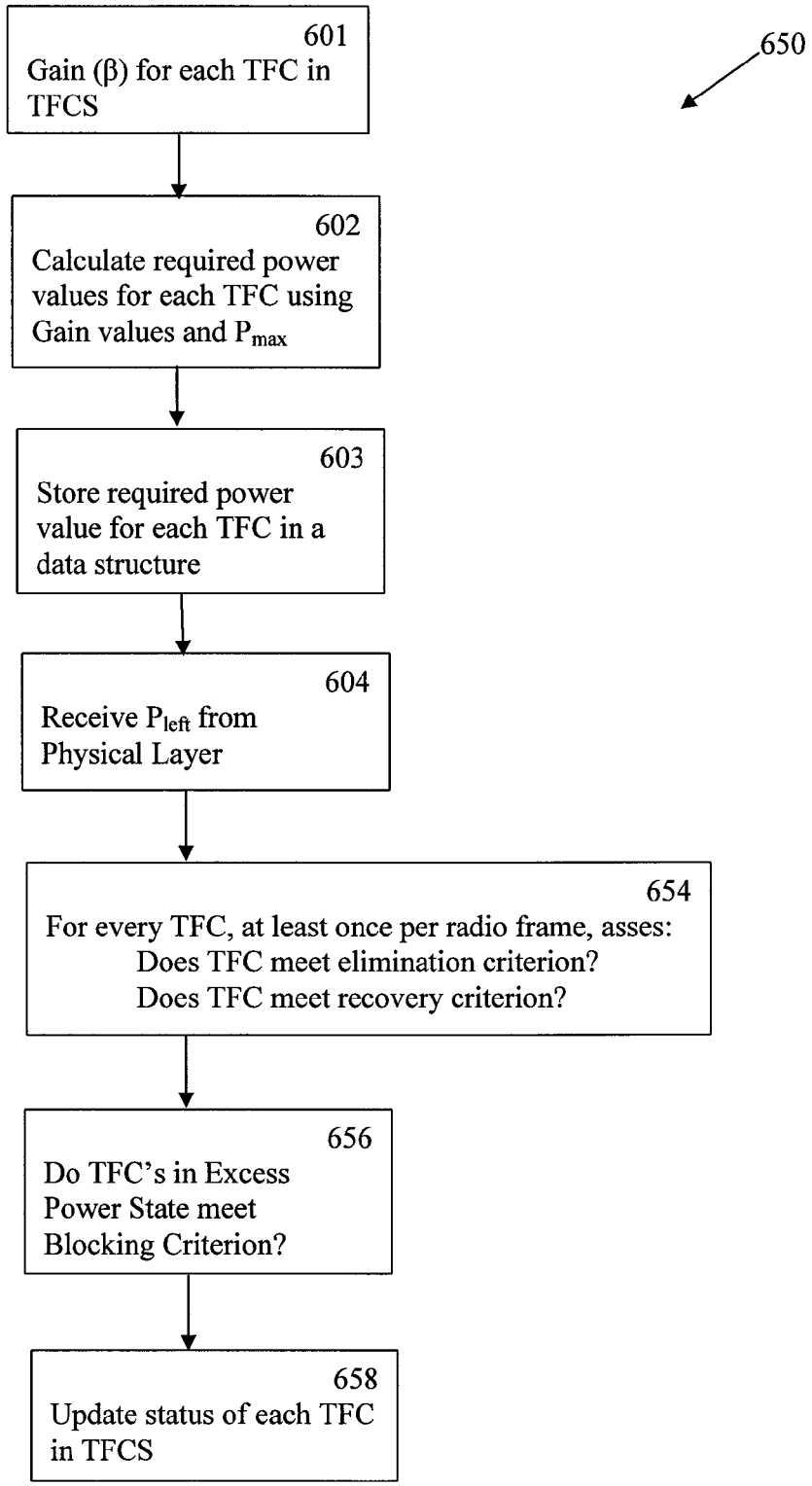
FIG. 6 is a flow diagram showing, at a high level, an improved series of power management steps to those shown in FIG. 5.

FIG. 6 shows an alternative power management calculation 650 according to the approach described herein. The power management calculation 650 is based upon the following derivation. Where, $P_{max}$ = maximum allowed $UE$ uplink transmitter power $P_{left}$ = received by $MAC$ from physical layer
= power remaining for $P_{dpdch}$ taking into account power required for $DPCCH$ $P_{dpcch}$ = power required for $DPCCH$ (control channel) (this is used as a reference channel here)

$P_{dpdch}$ = power required for $DPDCH$ (data channel) (an appropriate $TFC$ must be selected for handling this)

$\beta_{dj}$ = gain factor for $DPDCH$, $jth$ $TFC$, and $\beta_{cj}$ = gain factor for $DPCCH$, $jth$ $TFC$.

$A_j$ = power relation derived from gain factors, such that $A_j = \beta_{dj}/\beta_{cj}$.

Gain factors apply to voltage, so $V_{dpdch} = A_j \cdot V_{dpcch}$ where $V_{dpdch}$=voltage require to generate power output of $P_{dpdch}$ and $V_{dpcch}$=voltage require to generate power output of $P_{dpcch}$.

Taking power in dBm, we get:

$$P_{dpdch} = 20 \log A_j + P_{dpcch} \quad (1).$$

From the above definitions, we arrive at:

$$P_{dpcch} = P_{max} - P_{left} \quad (2).$$

The elimination criterion is met if:

$$P_{dpdch} + P_{dpcch} > P_{max}$$

Substitute for $P_{dpdch}$ using (1):

$$20 \log A_j + 2P_{dpcch} > P_{max}$$

then substitute for $P_{dpcch}$ using (2):

$$20 \log A_j + 2P_{max} - 2P_{left} > P_{max}$$

$$P_{left} < P_{max}/2 + 10 \log A_j.$$

Using this equation, the power relation $A_j$ is known from the gain factors.

If we define $P_{Rq(j)}$ = the required transmit power value for each $TFC$ $= P_{max}/2 + 10 \log A_j$ Then the test for elimination criterion is met if $P_{Rq(j)} > P_{left}$ and the test for recovery criterion is met if $P_{Rq(j)} \leq P_{left}$.

$P_{Rq(j)}$ can be pre-calculated from the gain factors for the jth TFC and the value of $P_{max}$. Where $P_{max}$ is the lowest of: the Maximum allowed uplink transmit Power; and the UE maximum transmit power.

Accordingly, the power management method 650 comprises the step of pre-calculating or calculating and storing a value of $P_{Rq}$ for each TFC. The stored value of $P_{Rq}$ is compared to the value of $P_{left}$ received from the physical layer. As such, no additional calculation is required by the UE to test the elimination and recovery criteria. The power management method 650 is illustrated in the diagram of FIG. 6. At step 601 the UE obtains the gain ($\beta$) for each TFC in the TFCS. At step 602 the UE calculates the required power value ($P_{Rq(j)}$) for each TFC using the relevant gain values and $P_{max}$. At step 603 the UE stores the required power value ($P_{Rq(j)}$) for each TFC in a data structure. At step 604 the UE receives the value of $P_{left}$ from the physical layer. At step 654, for every TFC of the TFCS, the UE assesses whether the TFC meets the elimination criterion and whether it meets the recovery criterion. Both of these assessments simply require a comparison of the value $P_{left}$ with the value of $P_{Rq(j)}$ for each TFC, $TFC_j$. At step 656 the UE establishes whether any TFCs in the Excess-Power state meet the blocking criterion. At step 658 the UE updates the status of each TFC in the TFCS in accordance with the result of the elimination, recovery and blocking criterion tests of step 654 and step 656.

In operation, $P_{Rq(j)}$ can be calculated when the UE has the TFC gain factors and the value of $P_{max}$. Reconfiguration will result in the values for gain and $P_{max}$ being changed. New values of $P_{Rq(j)}$ are calculated every time the configuration changes in Cell_DCH state. However, reconfiguration occurs relatively infrequently, and certainly less than every radio frame. As such the UE can precalculate $P_{Rq(j)}$. The Excess-Power and Recovery criterion evaluation required every radio frame for every TFC in the TFCS simply becomes a comparison of $P_{Rq(j)}$ with $P_{left}$ as received from the physical layer.

Figure 7:
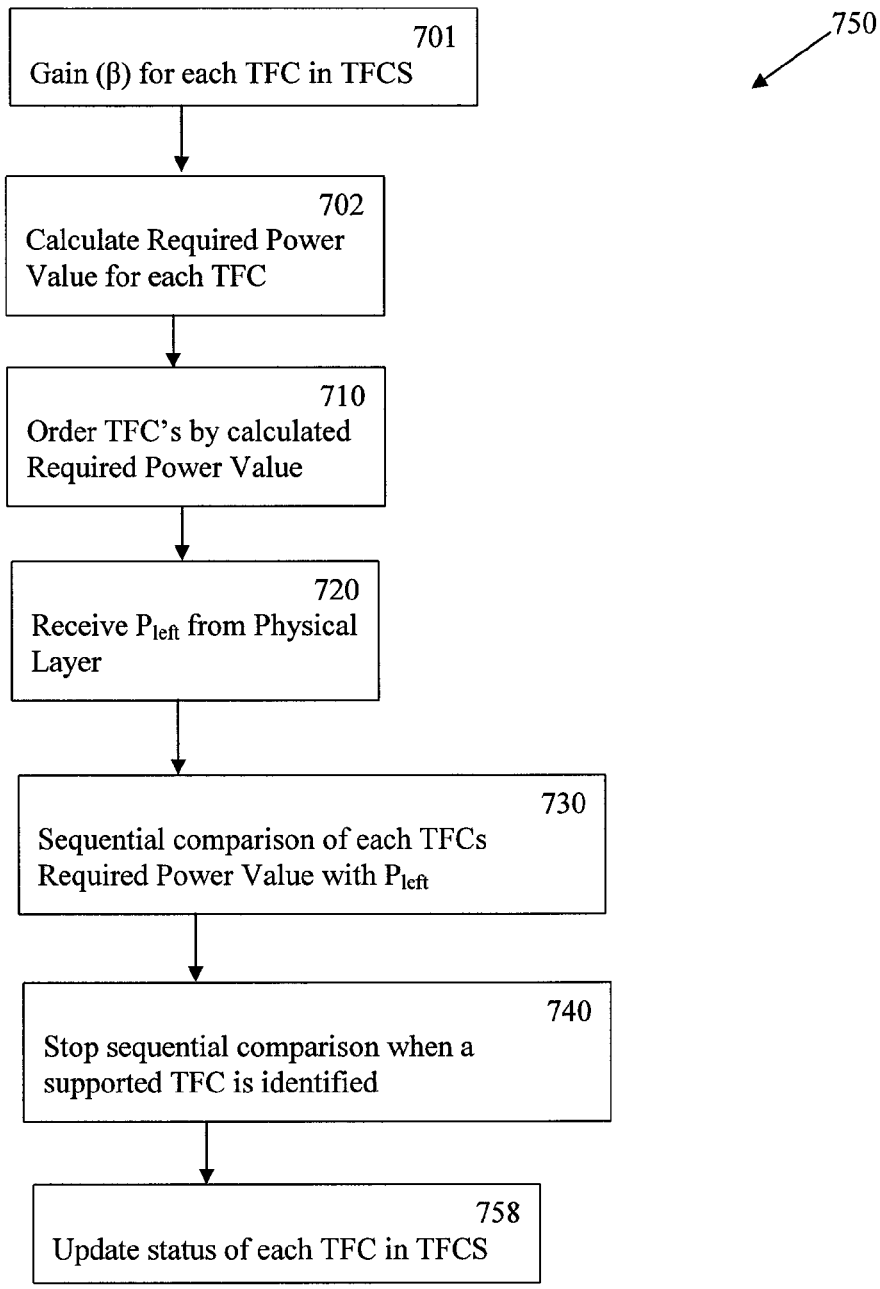
FIG. 7 is a flow diagram showing, at a high level, an alternative improved series of power management steps to that of FIG. 5 and FIG. 6.

FIG. 7 illustrates a further alternative power management calculation 750. In this method, the required power values for each TFC, $P_{Rq(j)}$, are pre-calculated as in calculation 650. Although this is not necessary for the implementation of this method. Power management calculation 750 additionally comprises the step of performing the comparison of $P_{Rq}$ with $P_{left}$ for each TFC in descending order of $P_{Rq}$. If $P_{Rq}$ is not calculated in advance then the comparison may be performed in order of some other value, for example a gain relation. According to this method, once a TFC is found satisfying $P_{Rq} \leq P_{left}$ then all subsequent TFCs, which have lower values of $P_{Rq}$, will also satisfy $P_{left}$ and so the comparisons can cease once a supported TFC is identified.

FIG. 7 is a flow diagram showing, at a high level, an alternative improved series of power management steps to that of FIG. 5 and FIG. 6. The power management calculation 750 may be substituted in for the power management steps 550 in the block diagram of FIG. 5. Power management calculation 750 starts at step 701 where the UE obtains the gain values (β) for each TFC in the TFCS. At step 702 the UE calculates the required power value $P_{Rq(j)}$ for each TFC, $TFC_j$.

At step 710 the TFCs of the TFCS are arranged in descending order of the calculated required power value $P_{Rq(j)}$. At step 720 the UE receives $P_{left}$ from the physical layer. At step 730 the UE performs a sequential comparison of each TFC's required power value with the received value of $P_{left}$. The sequential comparison is performed in descending order of required power value for each TFC until, at step 740, a supported TFC is identified. From the equations above, a supported TFC is identified as one for which the recovery criterion is met, i.e. that $P_{Rq(j)} \leq P_{left}$. Because the TFCs are arranged in descending order of $P_{Rq}$, and the comparison of $P_{Rq}$ with $P_{left}$ is performed in that order, when a TFC is identified for which $P_{Rq(j)} \leq P_{left}$, then it follows logically that all further TFCs also satisfy $P_{Rq(j)} \leq P_{left}$ and so are also supported. Accordingly, the sequential comparison is stopped when a TFC is identified for which $P_{Rq(j)} \leq P_{left}$. Stopping the sequential comparison in this way greatly reduces the amount of calculation required. At step 758 the UE updates the status of each TFC in the TFCS.

As above, in respect of calculation 650, in operation of calculation 750, $P_{Rq(j)}$ can be calculated when the UE has the TFC gain factors and the value of $P_{max}$. Reconfiguration will result in the values for gain and $P_{max}$ being changed. However, reconfiguration occurs relatively infrequently, and certainly less than every radio frame. As such the UE can pre-calculate $P_{Rq(j)}$ and arrange the TFCs in order, and store this information for use every radio frame. Then the Excess-Power and Recovery criterion evaluation required every radio frame for every TFC in the TFCS is simply a sequential comparison of $P_{Rq(j)}$ with $P_{left}$ as received from the physical layer. The sequential comparison is performed for the most power-hungry TFCs first. The sequential comparison stops when a TFC is found that is supported. If the most power hungry TFC is in the Supported state, then only one comparison is required for the UE to evaluate that all TFCs are in the Supported state. Typically only the TFCs requiring the most power for transmission, i.e the most power hungry TFCs, will be in Excess-Power state. When at least one TFC in the Supported state is identified the UE can stop the sequential comparison. The remaining TFCs having a lower value of $P_{Rq(j)}$ will be in the Supported state.

In the above described method the most power-hungry TFCs are the TFCs with the highest value of $P_{Rq(j)}$. Accordingly, the sequential comparison is performed in descending order of value of $P_{Rq(j)}$. In an alternative method, a different measure of required power could be used such that the most power hungry TFCs have the lowest value of the different measure of required power. In this case, the comparison would be performed in ascending order of the different measure of required power.

A data structure for implementing the calculation 750 described above is illustrated in FIG. 8. The data structure illustrated is for use with a system having four transport channels, as for example shown in FIG. 3. Each TFC defines a bit rate for each of the four transport channels $trch_1$ to $trch_4$. Furthermore, each TFC has associated with it two gain factors $\beta_c$ and $\beta_d$. As an alternative to the gain factors, the power relation $A_j$. As noted above, $A_j$=power relation derived from gain factors, such that $A_j = \beta_{dj}/\beta_{cj}$.

Also associated with each TFC is an indication as to whether the TFC is part of the minimum set or not, a calculated required power value $P_{Rq(j)}$ and an indication of the current state of the TFC (i.e. Supported, Excess-Power or Blocked). The data structure of FIG. 8 is for illustrative purposes only. It should be readily apparent to the reader that the information shown may be stored in any number of the data structures within an apparatus incorporating the method described herein.

The data structure of FIG. 8 records whether each TFC is part of a minimum set. The minimum set of TFCs cannot be in the Blocked state, they must always be in either the Supported state or the Excess-Power state, even if they meet the blocking criterion. Typically, the TFCs of the minimum set are the TFCs having the lowest bit rate for each transport channel.

The operation of the data structure of FIG. 8 will now be described with reference to FIG. 9. FIG. 9a shows a data structure equivalent to that of FIG. 8 but for a simplified system having only two transport channels and five TFCs. Initially, as shown in FIG. 9a each of the TFCs is in a Supported state. The gain information for each TFC has been received or calculated and accordingly the required power $P_{Rq(j)}$ for each $TFC_j$ has been calculated. Furthermore the TFCs have been arranged in order of the required power. In this example, the TFC with the highest bit rate has the highest required power. In the situation shown in FIG. 9a, $P_{left} > P_{Rq5}$ and so all TFCs are in the Supported state.

FIG. 9b illustrates the status of the system when $P_{left}$ drops such that $P_{Rq4} > P_{left} > P_{Rq3}$. According to the method, the following tests are performed.

$TFC_5$: $P_{left} > P_{Rq5}$? No. Go to next TFC
$TFC_4$: $P_{left} > P_{Rq4}$? No. Go to next TFC
$TFC_3$: $P_{left} > P_{Rq3}$? Yes. Stop comparisons.

Accordingly $TFC_5$ and $TFC_4$ are not supported so these must be transitioned to the Excess-Power state as shown in FIG. 9b. In this example the blocking criterion has been tested but neither $TFC_5$ nor $TFC_4$ is blocked. $TFC_3$ is supported. Because the TFCs have been arranged in order of required power, once it is established that $P_{left} > P_{Rq3}$, we know that $P_{Rq2}$ and $P_{Rq1}$ are also less than $P_{left}$ such that $TFC_1$ and $TFC_2$ are also supported. This is established as a result of the test in respect of $TFC_3$. $TFC_3$ is the first supported TFC and so no further testing is required in respect of the following TFCs for the elimination or recovery criterion.

FIG. 9c illustrates the state of the system in response to the receipt of a new value for $P_{left}$ from the physical layer wherein $P_{Rq5} > P_{left} > P_{Rq4}$. Again, sequential testing is performed in respect of each TFC.

$TFC_5$: $P_{left} > P_{Rq5}$? No. Go to next TFC
$TFC_4$: $P_{left} > P_{Rq4}$? Yes. Stop comparisons.

So it is established that $TFC_5$ is not supported and furthermore that it cannot meet the recovery criterion because $P_{left} < P_{Rq5}$. For the sake of this illustration $TFC_5$ meets the blocking criterion and is transitioned to the Blocked state. $TFC_4$ meets the recovery criterion of $P_{left} \geq P_{Rq4}$ and so this state is transitioned from Excess-Power state to Supported state. Because $TFC_4$ satisfies $P_{left} \geq P_{Rq4}$ no comparison is required in respect of $TFC_3$, $TFC_2$ or $TFC_1$. These three states remain in the Supported state.

The skilled reader will appreciate that any appropriate manner for implementing the additional steps described above at the UTRAN or UE can be adopted in hardware, software or firmware. For example the additional identification or acknowledgement steps can be implemented at the respective components in any appropriate manner.

In the above described method and apparatus, the control channel DPCCH is always transmitted such that $P_{left}$ is defined as the maximum US transmit power less the power required to transmit DPCCH. It will be appreciated by a person skilled in the art that the present invention may be advantageously applied to a system wherein any channel is always transmitted, or indeed where no channel is transmitted.

In an alternative, the sequential comparison may be performed starting with the least power-hungry TFCs. The least power hungry TFCs have the lowest value of $P_{Rq(j)}$. Accordingly, the sequential comparison is performed in ascending order of value of $P_{Rq(j)}$. The sequential comparison will stop when a TFC in the Excess-Power state is identified. In a further alternative method, a different measure of required power could be used such that the least power hungry TFCs have the highest value of the different measure of required power. In this case, the comparison would be performed in descending order of the different measure of required power.

In the above described implementation, $P_{left}$ is reported from the physical layer to the MAC and this is used in a comparison with $P_{Rq(j)}$ for each TFC. In an alternative implementation, a different measured power value may be returned to the MAC from the physical layer. For example, $P_{dpcch}$ may be reported to the MAC. In this situation, $P_{left}$ is calculated according to $P_{left} = P_{max} - P_{dpcch}$, prior to the sequential comparison being initiated. However, any indication of an available measured power value may be used, this need not be a power value.

An alternative solution where $P_{left}$ is not reported to the MAC is to redefine $P_{Rq(j)}$ such that a comparison with the value reported to the MAC can be made without further calculation.

An indication of the required power for a transmission channel configuration may be calculated using the maximum transmit power of the mobile communications apparatus and a power relation $A_j$ of the transmission channel configuration.

In the above embodiments, the measured power value for the previous slot is received by the MAC from the physical layer. In some systems, 15 slots (1 frame) of power values may be received at once. Where the above described method is implemented in such a system, a comparison of each TFC's required power value with the received value of $P_{left}$ is in fact a plurality of comparisons performed for at least some of the received slot values. In fact, at least 15 of the previous 30 slot power values need to be compared against the threshold for the elimination criteria.

In the foregoing specification, the invention has been described with reference to specific embodiments thereof. It will, however, be evident that various modifications and changes may be made thereto without departing from the scope of the technique. The specification and drawings are, accordingly, to be regarded in an illustrative rather than a restrictive sense.

It is to be noted that the methods as described have shown steps being carried out in a particular order. However, it would be clear to a person skilled in the art that the order of the steps performed, where the context permits, can be varied and to that extent the ordering of the steps as described herein is not intended to be limiting.

It is also to be noted that where a method has been described it is also intended that protection is also sought for a device arranged to carry out the method and where features have been claimed independently of each other these may be used together with other claimed features.

It will further be understood that the method and apparatus described herein can be applied in relation to any release or similar procedure following steps as set out in any appropriate standard and between any appropriate user equipment components and access network components or indeed between components of a similar nature in any case where power between links in respect of directions is controlled by the link channel in the opposite direction where either can be an uplink or downlink.

Furthermore it will be noted that the apparatus described herein may comprise a single component such as a UE or UTRAN or other user equipment or access network components, a combination of multiple such components for example in communication with one another or a sub-network or full network of such components.

A portion of the disclosure of this patent document contains material which is subject to copyright protection. The copyright owner has no objection to the facsimile reproduction by anyone of the patent document or patent disclosure, as it appears in the Patent and Trademark Office patent file or records, but otherwise reserves all copyright rights whatsoever.

The invention claimed is:

1. A method for identifying supported transmission channel configurations in a mobile communications apparatus, the method comprising:
   pre-calculating the required power value for each transmission channel configuration using a value of the mobile communications apparatus maximum transmit power and a gain relationship, the gain relationship being a ratio of a gain for the transmission channel configuration data channel with gain for the transmission channel configuration control channel; and
   performing a sequential comparison of:
      an indication of an available measured power value calculated from a measurement of transmit power of a particular preceding transmission interval and using a gain relationship of the transmission channel configuration used during the particular preceding transmission interval, and
      an indication of the required power for each transmission channel configuration; and
   identifying a particular transmission channel configuration as supported if the required power for the particular transmission channel configuration is less than the available power value;
   wherein:
      the transmission channel configurations are arranged in descending order of the indication of required power;
      the sequential comparison is performed in descending order of magnitude of value of the indication of the required power; and
      the method further comprising stopping said comparison when a supported transmission channel configuration is identified.

2. The method as claimed in claim 1, wherein the gain relationship is derived from a signaled gain factor or a computed gain factor.

3. The method as claimed claim 1, wherein the sequential comparison is performed in order of the transmission channel configuration having the greatest power requirement first.

4. The method as claimed in claim 1, wherein the transmission channel configurations are transport format combinations.

5. The method as claimed in claim 1, wherein the mobile communications apparatus is a user equipment in a universal mode telecommunications system network.

6. The method as claimed in claim 1, wherein the step of pre-calculating comprises calculating and storing.

7. The method as claimed in claim 1, wherein the step of pre-calculating is performed at reconfiguration of the mobile communications apparatus.

8. A mobile communications apparatus arranged to perform the method of claim 1.

9. A computer program product comprising code means stored on a non-transitory computer readable medium for performing the steps of the method of claim 1.

10. A computer operating under the instructions of a computer program product comprising code means stored on a non-transitory computer readable medium for performing the steps of the method of claim 1.

11. A mobile communications apparatus arranged to perform the method of claim 1.

12. A computer program product comprising code means stored on a non-transitory computer readable medium for performing the steps of the method of claim 1.

13. A computer operating under the instructions of a computer program product comprising code means stored on a non-transitory computer readable medium for performing the steps of the method of claim 1.

* * * * *